United States Patent [19]
Haupt et al.

[11] Patent Number: 5,981,030
[45] Date of Patent: Nov. 9, 1999

[54] ROOFING MEMBRANE

[75] Inventors: Bertram W. Haupt, Hamburg; Siegfried Heinz; Wolfgang Rudolf, both of Berlin, all of Germany

[73] Assignee: FAMOS GmbH, Kyritz, Germany

[21] Appl. No.: 08/936,882

[22] Filed: Sep. 25, 1997

[30] Foreign Application Priority Data

Sep. 26, 1996 [DE] Germany .................. 296 17 379 U

[51] Int. Cl.⁶ .............. E04D 13/04; D06N 5/00; B32B 7/04
[52] U.S. Cl. .............. 428/143; 428/72; 428/166; 428/178; 428/198; 428/192; 428/22; 428/27; 428/15; 428/913; 428/137; 52/91.1; 47/65.9
[58] Field of Search .............. 428/72, 166, 178, 428/143, 198, 192, 22, 27, 15, 913, 137; 52/91.1; 47/65.9

[56] References Cited

U.S. PATENT DOCUMENTS

| | | | |
|---|---|---|---|
| 3,659,396 | 5/1972 | Baker | 53/180 |
| 4,534,142 | 8/1985 | Drefahl | 52/90 |
| 5,287,650 | 2/1994 | Moriguchi et al. | 47/59 |
| 5,309,673 | 5/1994 | Stover et al. | 47/59 |
| 5,410,840 | 5/1995 | Loesken | 47/58 |
| 5,456,733 | 10/1995 | Hamilton, Jr. | 47/58 |
| 5,608,989 | 3/1997 | Behrens | 47/65.9 |

*Primary Examiner*—William P. Watkins, III
*Attorney, Agent, or Firm*—Oldham & Oldham Co., LPA

[57] ABSTRACT

A roofing membrane has a quantity of water-retaining particles fixed in the upper surface of the membrane. A fleece web affixed to the membrane surface in a quilt-like manner may provide zones of selectable size for holding the particles in place. By varying the amount of the absorber particles, the water-retaining capacity of the roofing membrane may be varied to the particular intended use, such as on a flat roof or a sloped roof.

15 Claims, 1 Drawing Sheet

ROOFING MEMBRANE

DESCRIPTION

The invention relates to a roofing membrane which consists of a roofing membrane which cannot be pierced by roots as the base material and absorbers for water retention arranged on this base, held in a stable manner on the roofing membrane by means of a web coating.

BACKGROUND OF THE ART

It is known that absorber particles e.g. hydrophilic acrylamide polymers, are added to soil for the purpose of water retention in sandy soils, in order to reduce the quantity or water which sinks to a level beyond the reach of roots.

Similarly for retention, suitable gel granulates are added to various substrates used for grass covering of roofs to ensure sufficient water supply for the plants despite a relatively small volume of substrate (e.g. EP 369062).

However, freely mixing absorbers into vegetation substrates does not allow fixing of the absorber particles at a defined level in the substrate layer. Because the absorber particles wander, they become irregularly distributed in the substrate which has a negative effect on the retention capacity. Simultaneously, the volume alteration resulting from the absorption of water results in repeated shifting of the substrate particles within the vegetation structure and thus causes damage to the capillary root system. The shifting of the absorber particles can also impair the local stability of the vegetation substrate.

SUMMARY OF THE INVENTION

The current invention is thus designed in response to the requirement to create a root-impenetrable roofing membrane which has water retaining properties without possessing the disadvantageous effects involved when using non-fixed absorber particles. The water retaining roofing membrane is designed both for sloping and flat roofs and should allow an essentially constant retention and release of moisture which promotes plant growth. Additionally, the draining behavior of extensive roof greening projects with a small layer thickness should be positively influenced by this water retaining roof protection membrane, because the draining coefficient is kept low.

This task of the invention is resolved by the fact that the root-impenetrable roofing membrane serves as a direct base material for the moisture absorber. The absorber is fixed to the roofing membrane by means of a web which is water penetrable and attached to the roofing membrane. This fixing means that the absorber is not flushed out in heavy rainfall and also prevents it from wandering into higher levels of the substrate or shifting to the edges on sloping roofs. The advantage of this solution lies in the fact that the moisture absorber can be applied in a pre-determined distribution and dosage and the fixing ensures that the desired positioning of the absorber is maintained. The fixing of the web in accordance with the invention allows unimpeded water absorption and expansion of the absorber, Using a fleece-type web means that saturation of the gel particles with fine-grain substrate fractions is prevented, giving the roofing membrane a certain drainage effect in addition to its water retaining function, and simultaneously reducing unwanted excess water. Used in dry regions this roofing membrane ensures an efficient utilization of the low level of precipitation due to the surface-remote position of the absorber particles and the resulting low evaporation coefficient, so that a high quality roof vegetation is also possible in such areas.

Another advantage is the reduction of additional roof burden from the build-up of the vegetation when this water retaining roofing membrane is used, because roof structures with a few layers and very low layer heights can be used without detrimental effects on the vegetation and thus the function of the roof greening system. Equally advantageous is the option of varying the retention volume of the roofing membrane in accordance with the invention by employing suitable absorber distribution and concentration for different types of use (flat or sloping roofs).

A further version of the invention uses a water pervious web for fixing the absorber particles which is applied to the membrane in the manner of a quilt. When a roofing membrane manufactured in such a way is used, which can be used on more steeply inclines roofs, it is possible to adjust the size of the areas formed by the quilt-type coating to suit different requirements. In this way it is possible on sloping roofs to use membranes with a higher water retention capacity near the ridge than on the rest of the roof surface.

A further version of the invention takes account of the fact that it can be expedient for use of flat roofs to fix the absorber particles by means of a fully laminated perforated film. By using an adequately perforated film the unimpeded contact of water with the absorber particles is ensured. The volume increase of the absorber particles which results from the water absorption quickly causes the necessary lifting of the film from the base material, thus creating sufficient volume for the full utilization of the water retention capacity.

It is also possible to apply absorber particles with a particle size of $\geq 2\,1000\,\mu m$ in small quantities directly onto the membrane surface without any further fixing.

It is possible to use bituminous root-impenetrable roofing membrane as well as corresponding root-impenetrable membranes based on synthetic films as the base material for the absorber particles and the coating in accordance with the invention. The application of the absorber particles and the coating with the web are carried out while the base material is still in a plastic condition. The fixing of the web can be varied by using differently designed pressure rollers.

BRIEF DESCRIPTION OF THE DRAWINGS

The invention is more closely described with the help of the figures.

They show the following.

DETAILED DESCRIPTION OF THE INVENTION

Figure 1:
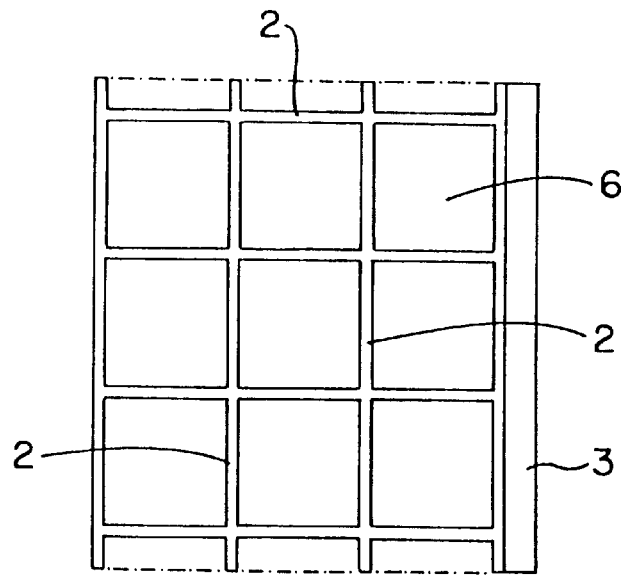
FIG. 1: a top view of a roofing membrane with quilt-type laminated fleece

FIG. 1 shows the quilt-type lamination (2) of the fleece with which the absorber particles are fixed on the roofing membrane. The areas (6) in which the absorber particles are held in a stable manner and which offer sufficient space for the volume increase of the absorber particles, can be infinitely varied in size and shape (3) shows an edge strip free of absorber particles for the purpose of adhering the strips of roofing membrane together.

Figure 2:
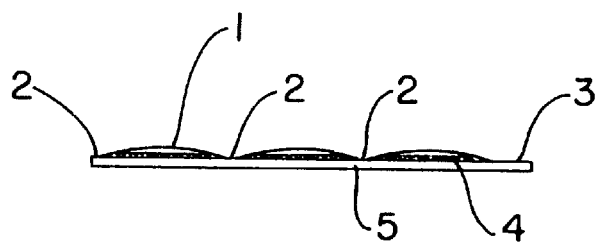
FIG. 2: a cross section of a roofing membrane with laminated fleece and absorber particles

FIG. 2 shows a schematic cross section of a roofing membrane in accordance with the invention. The absorber (4) is applied in a defined dosage on the base material (5), which can be either a plastic film or a bituminous roofing membrane. The absorber (4) is expediently applied in a quantity which corresponds to a water storing capacity of 1–5 l/m². The fleece (1) is firmly joined to the base material at predetermined intervals by means of lamination (2).

Figure 3:
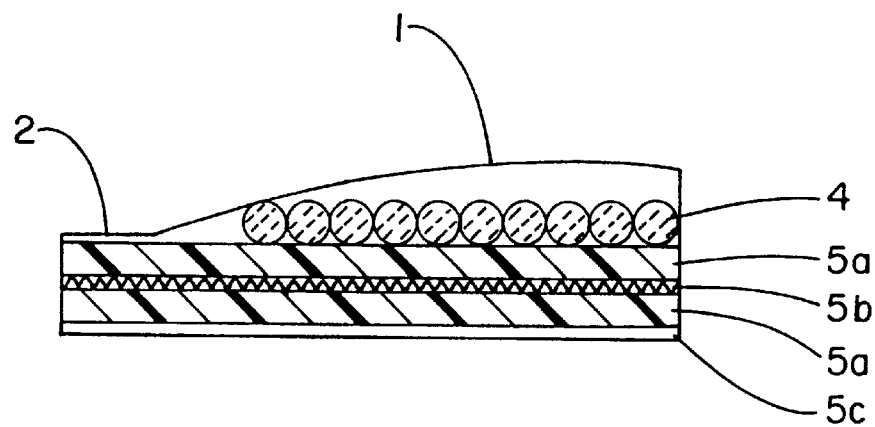
FIG. 3: a cross section of a root-impervious bituminous roof membrane with details of the layer structure.

FIG. 3 shows a cross sectional detail of the roofing membrane in accordance with the invention shown in FIG. 2 on the basis of a bituminous root-impervious membrane. The build-up shows the fleece (1) with the laminated area (2) used for fixing the absorber particles (4). The laminated area expediently has a width of 10 to 30 mm. The bitumen membrane itself consists of two APP or SBS modified layers of bitumen (5a) and a combination insert (5b) which provides firmness and dimensional stability. The root-imperviousness of the membrane is achieved either with a Cu film in (5b) and/or with the addition of "Preventol" in (5a).

In a further version of the invention which is not represented in a diagram, the welding film (5c) can be applied in a highly perforated form on the top as a fixing aid for the absorber particles.

What is claimed is:

1. A roofing membrane, characterized by having a plurality of water retaining absorber particles on a top surface thereof, the absorber particles being arranged in fixed stable positions by means of a web which is applied as a laminated coating.

2. The roofing membrane in accordance with claim 1, characterized by an edge strip on one side of the membrane which is substantially free of the absorber particles.

3. The roofing membrane in accordance with claim 1, characterized by having a sufficient quantity of the absorber particles to provide the roofing membrane with a water retaining capacity in the range of from about 1 to about 5 l/m².

4. The roofing membrane in accordance with claim 1, wherein the web is a water pervious fleece applied on said top surface.

5. The roofing membrane in accordance with claim 4, wherein the fleece is fixed on the roofing membrane by a coating in the manner of a quilt and encloses absorber areas of variable size.

6. The roofing membrane in accordance with claim 1, wherein is a perforated film which covers the absorber particles and which is applided over entire surface.

7. The roofing membrane in accordance with claim 1, characterized by the fact that the absorber particles are applied directly onto the roofing membrane.

8. The roofing membrane of claim 1 wherein the water retaining absorber particles comprise polyacrylamide.

9. The roofing membrane of claim 1 wherein the plurality of water retaining absorber particles are evenly distributed over the entire top surface of the membrane.

10. The roofing membrane of claim 1 wherein substantially all of the absorber particles have a particle size equal to or less than about 1000 microns.

11. The roofing membrane of claim 5, wherein an edge strip on one side of the membrane is substantially free of the absorber particles.

12. The roofing membrane of claim 5, wherein there is a sufficient quantity of the absorber particles to provide the roofing membrane with a water retaining capacity in the range of from about 1 to about 5 l/m².

13. The roofing membrane of claim 6, wherein an edge strip on one side of the membrane is substantially free of the absorber particles.

14. The roofing membrane of claim 6, wherein there is a sufficient quantity of the absorber particles to provide the roofing membrane with a water retaining capacity in the range of from about 1 to about 5 l/m².

15. A roofing system, comprising:

a root impenetrable membrane, having a bottom surface and a top surface; and a web which is applied as a laminated coating to the top surface, said web containing a plurality of water retaining absorber particles arranged in fixed stable positions.

* * * * *